H. C. CONORD.
FILM SPLICING TOOL.
APPLICATION FILED JULY 13, 1918.
1,319,209.
Patented Oct. 21, 1919.
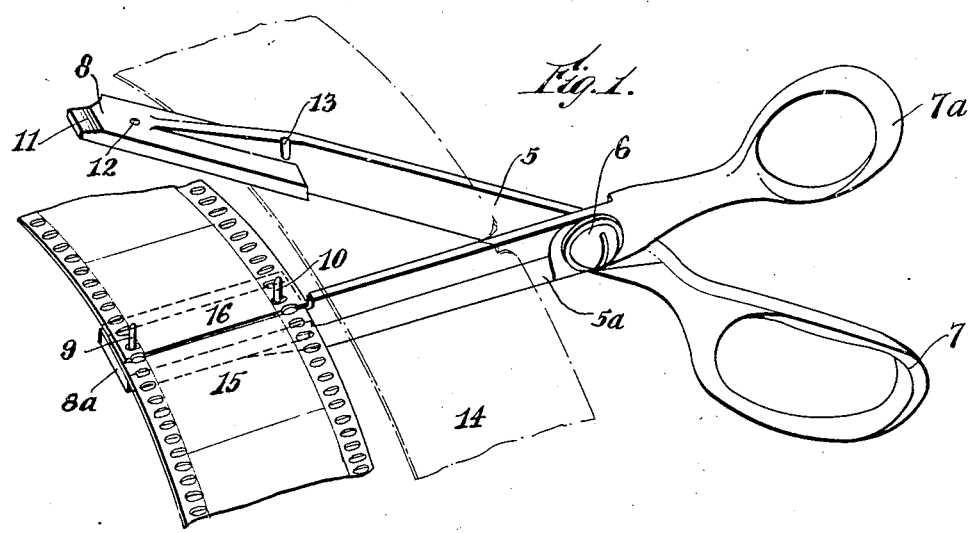
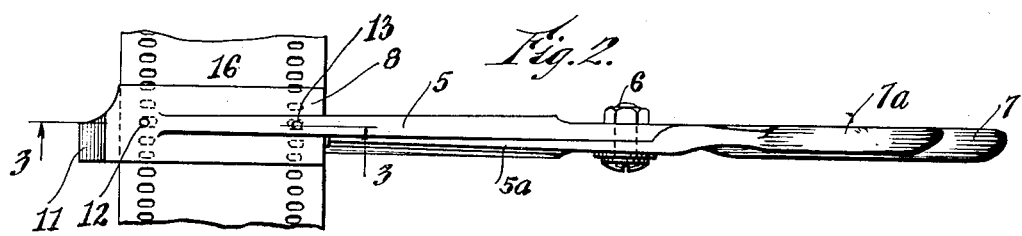
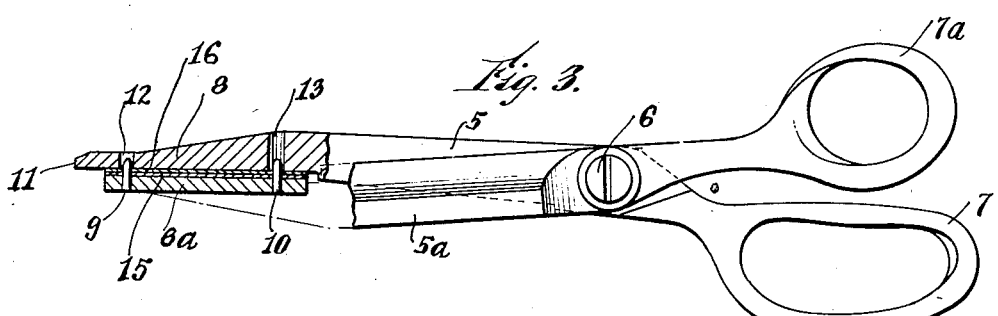
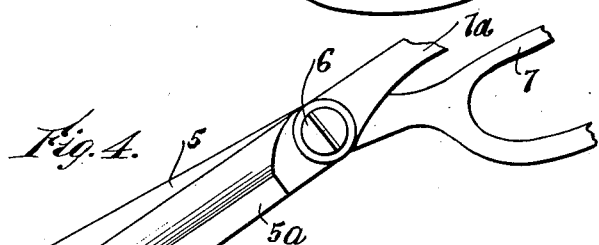
WITNESSES
INVENTOR
Herbert C. Conord,
BY Charles Horton
his ATTORNEY

UNITED STATES PATENT OFFICE.

HERBERT C. CONORD, OF BROOKLYN, NEW YORK.

FILM-SPLICING TOOL.

1,319,209.  Specification of Letters Patent.  Patented Oct. 21, 1919.

Application filed July 13, 1918. Serial No. 244,813.

*To all whom it may concern:*

Be it known that I, HERBERT CHARLES CONORD, a citizen of the United States of America, residing at 860 Herkimer St., Brooklyn, New York, have invented new and useful Improvements in Film-Splicing Tools, of which the following is a specification.

The purpose of this invention is to supply a simple, durable, and easily manipulated instrument for splicing moving picture film. Moving picture film is of a soft fragile nature and frequently breaks while in use and is also many times intentionally cut to remove some objectionable part or to remove a worn part. When this is done it has become customary to lap the two ends of the film over and cement the joint with a special cement. Since a patch so made consists of two thicknesses of film it is evident that it is much less flexible than the unpatched film and this causes it to pass through the projector with some difficulty or the chance of a second break with the consequent delay in the progress of the picture being shown. If also the patch has been carelessly made the sprocket holes may not be in alinement and this is a cause of much breakage of film and the consequent "dark screen" which is so carefully guarded against by moving picture exhibitors. When a film breaks in the course of a show a quick repair is imperative and in making such a repair in haste a bad job is practically certain to be done. It is then, the purpose of this invention to supply a tool for quick and at the same time perfectly accurate splicing.

The device consists primarily of a scissor member having on the end of each blade a flat part with pins for the sprocket holes in the film and a scraper member, all so arranged that it is very easy to cut the film with the scissors, scrape off the emulsion with the scraper and hold the splice together after applying the cement with the flat jaw members.

Reference to the drawings herewith will serve to show more clearly the details of arrangement of the several parts and the uses thereof.

Figure 1 is a perspective view of the film-mending device showing a section of film being cemented and also the correct position of a section of film as it is being cut.

Fig. 2 is a top view of the device showing a section of film having been cemented and being held in proper alinement for drying.

Fig. 3 is an elevation of the device with a part broken away to show a portion of film between the jaws and the arrangement of locating pins, and, Fig. 4 is a fragmentary view of the device showing the scraper in use.

Referring now to the figures in detail the device is seen to consist in the preferred construction of a pair of scissor members, the blades shown at 5 and 5ᵃ. These blades are pivoted as in an ordinary scissors at 6 and have hand loops for manual operation, at 7 and 7ᵃ. Adjacent the pointed ends of the scissors blades 5 and 5ᵃ are arranged, in this case integrally with the blades, a pair of flat surfaces 8 and 8ᵃ so arranged as to come into flat contact when the blades are brought together. Projecting out from the surface 8ᵃ and in correct position to engage a pair of holes in a film are arranged two pins as at 9 and 10, and in the flat portion 8 is arranged a pair of holes as at 12, 13 to engage the pins 9 and 10. At the end of one of the flat surfaces 8, 8ᵃ, is arranged an edge for scraping as at 11.

The method of using the device will be obvious from the drawings but may be further explained as follows: The first operation is to pass the intact film between the blades well back into the position shown in dotted lines at 14 in Fig. 1 and then to sever the same by closing the shear member as with an ordinary scissors. The next operation is to lay one end, as at 15, of the two sections of film down on some flat surface and scrape some of the emulsion from it as shown in Fig. 4 where a section of film is shown at 16 and the emulsion being removed by the scraper as at 17. The third operation is to apply a small quantity of cement to the ends of the portion of film thus prepared and lay the ends of both portions as at 15, 16 over the pins, 9 and 10 on the flat surface 8ᵃ with the cement between them and finally the flat surfaces 8 and 8ᵃ are brought together and held so which presses the ends of the film portions 15 and 16 firmly together while the pins, 9 and 10 hold them in proper relation. The pressure is maintained for a few moments until the cement has dried and then the joined film is removed from the instrument by opening the jaws and lifting the film out.

It is evident from the above description that by the use of this instrument perfect patches are to be made even by one unskilled in the making of patches and that consequently a great gain in efficiency is made in the projection of moving pictures.

Many minor changes may of course be made in the actual design of the instrument without change of the basic principles.

The appended claims are an abstract of the invention as conceived by the inventor.

Claims.

1. In an instrument for splicing film the combination of a shear having blades and handles, a flat portion formed adjacent the extremity of one blade of said shear, said flat portion having a plurality of pins projecting therefrom for engagement with holes in said film, a second flat portion formed adjacent the extremity of another blade of said shear, said second flat portion having a plurality of holes for engagement with said pins in said first mentioned flat portion and a sharpened portion adjacent the end of one of said flat portions.

2. In a combination tool for splicing film the combination of a scissors, a scraper and a forcep, said forcep having pins in one jaw and holes in another jaw, said pins and said holes being arranged to coöperate with each other and with the film.

In testimony whereof, I, HERBERT CHARLES CONORD, have signed my name to this specification in the presence of two subscribing witnesses, this 29th day of June, 1918.

HERBERT C. CONORD.

Witnesses:
SARAH KARPAY,
JANET GILBERT.